United States Patent [19]

Inoue et al.

[11] Patent Number: 5,066,539

[45] Date of Patent: Nov. 19, 1991

[54] MAGNETIC RECORDING MEDIUM WHEREIN THE MAGNETIC LAYER CONTAINS COMPONENTS HAVING SPECIFIED POLAR GROUPS, PARTICLE DIAMETERS AND SURFACE AREAS OR WHICH ARE IN SPECIFIC RELATIVE RATIOS

[75] Inventors: Makoto Inoue; Hiroshi Miura; Kaneaki Niita; Toshiyuki Sano; Yoshitaka Tsukidate; Takahiro Miyazaki, all of Miyagi, Japan

[73] Assignee: Sony Corporation, Tokyo, Japan

[21] Appl. No.: 500,300

[22] Filed: Mar. 28, 1990

[30] Foreign Application Priority Data

Mar. 29, 1989 [JP] Japan ................................. 1-83698
Mar. 31, 1989 [JP] Japan ................................. 1-74834

[51] Int. Cl.$^5$ ............................................. G11B 23/00
[52] U.S. Cl. ................................. 428/328; 428/694; 428/402
[58] Field of Search ................. 428/694, 900, 328, 402

[56] References Cited

U.S. PATENT DOCUMENTS 4,521,486 6/1985 Ninomiya et al. .................. 428/407
4,835,049 5/1989 Ishiguro et al. .................... 428/323
4,885,208 12/1989 Akari et al. ........................ 428/403

*Primary Examiner*—Merrell C. Cashion, Jr.
*Assistant Examiner*—Stevan A. Resan
*Attorney, Agent, or Firm*—Hill, Van Santen, Steadman & Simpson

[57] ABSTRACT

A magnetic recording medium improved in electromagnetic conversion characteristics and runnability is disclosed. The magnetic recording medium is formed by coating a non-magnetic substrate with a magnetic layer. The magnetic layer contains a fine ferromagnetic powder having a specific surface area larger than 45 m$^2$/g, a binder having polar groups such as —SO$_3$M and —O-SO$_3$M in the molecule in an amount of 0.2 to 0.8 μmol per m$^2$ of the specific surface area of the ferromagnetic powder, and a compound having 2 or more carboxylic groups in an amount of 0.5 to 5.0 μmol per m$^2$ of the specific surrface of the ferromagnetic powder. The magnetic layer is further incorporated with a carbon powder having a mean diameter of 200 to 400 nm and a specific surface area of 5 to 20 m$^2$/g to improve the runnability of the magnetic recording medium while keeping the improved magnetic characteristics.

1 Claim, No Drawings

MAGNETIC RECORDING MEDIUM WHEREIN THE MAGNETIC LAYER CONTAINS COMPONENTS HAVING SPECIFIED POLAR GROUPS, PARTICLE DIAMETERS AND SURFACE AREAS OR WHICH ARE IN SPECIFIC RELATIVE RATIOS

BACKGROUND OF THE INVENTION

The present invention relates to a magnetic recording medium such as a magnetic tape. More particularly, it is concerned with a magnetic recording medium of so-called coating type which consists of a non-magnetic substrate and a magnetic layer formed thereon by the application of a magnetic paint composed mainly of a ferromagnetic powder and binder.

The magnetic recording medium such as a magnetic tape or a magnetic disc, which medium is in general use, is of so-called coating type. It consists of a non-magnetic substrate such as polyester film and a magnetic layer formed thereon by the application of a magnetic paint prepared by intimately mixing a fine ferromagnetic powder, resin binder, organic solvent, and a variety of additives. It is improving in performance to meet the requirement for higher recording densities. For this reason, the conventional ferromagnetic powder is being replaced by a new one which has a smaller particle diameter and a larger specific surface area. Moreover, there is appearing in the industry an ultrafine ferromagnetic powder made of a metal (such as Fe, Ni, and Co) or an alloy thereof which has superior magnetic properties.

The magnetic recording medium of the coating type should meet several requirements. That is, the ferromagnetic powder having an extremely small particle diameter should be uniformly dispersed into a binder resin. The magnetic layer should have improved surface properties so that it exhibits improved electromagnetic conversion characteristics. The magnetic coating film should have improved durability. In other words, a very important problem associated with the magnetic recording medium of the coating type is how to disperse a ferromagnetic powder uniformly into the magnetic layer and how to establish a good bond between the ferromagnetic powder and the binder.

A conventional way to meet these requirements was to add a dispersing agent (such as lecithin) to the magnetic paint or to introduce a polar group into the binder. However, this is not satisfactory for the complete dispersion of a fine ferromagnetic powder having a specific surface area larger than 45 $m^2/g$, because the finer the ferromagnetic powder becomes, the greater the cohesive force it has. The addition of a dispersing agent (such as lecithin) is liable to lower the coating film strength because of its weak affinity to the binder and hence poor interfacial reinforcement.

The uniform dispersion of a ferromagnetic powder is also necessary for good runnability because it provides the magnetic layer with a smooth surface which has a substantially low coefficient of friction. A conventional measure to meet this requirement was to add a dispersing agent (such as lecithin) to the magnetic paint, to introduce a polar group into the binder, or to add carbon to the magnetic layer. The addition of carbon, however, does not fully exhibit its effect in the case of a magnetic layer containing a fine ferromagnetic powder uniformly dispersed therein. A large amount of carbon has to be added to lower the coefficient of friction to a certain extent; this deteriorates the electromagnetic conversion characteristics instead.

OBJECTS AND SUMMARY OF THE INVENTION

The present invention was completed to address the above-mentioned problems involved in the prior art technology. Accordingly, it is an object of the present invention to provide a magnetic recording medium having superior surface properties and electromagnetic conversion characteristics. This object is achieved by improving the dispersibility of a ferromagnetic powder having a large specific surface area. It is another object of the present invention to provide a magnetic recording medium having not only superior surface properties and electromagnetic conversion characteristics but also superior runnability. This object is achieved by improving the dispersibility of a ferromagnetic powder having a large specific surface area and also by lowering the coefficient of friction of the magnetic layer.

According to the first aspect of the present invention, there is provided a magnetic recording medium which comprises a non-magnetic substrate and a magnetic layer formed thereon, said magnetic layer being composed mainly of a ferromagnetic powder having a specific surface area larger than 45 $m^2/g$ and a binder resin having a —$SO_3M$ group and/or —$OSO_3M$ group (where M denotes an alkali metal) introduced thereinto, with the amount of said —$SO_3M$ group and/or —$OSO_3M$ group being 0.2 to 0.8 $\mu$mol per $m^2$ of the surface area of the ferromagnetic powder, and said magnetic layer containing a compound having a plurality of carboxyl groups in the molecule, with the amount of said carboxyl groups being 0.5 to 5 $\mu$mol per $m^2$ of the surface area of the ferromagnetic powder.

According to the second aspect of the present invention, there is provided a magnetic recording medium which comprises a non-magnetic substrate and a magnetic layer formed thereon, said magnetic layer being composed mainly of a ferromagnetic powder having a specific surface area larger than 45 $m^2/g$ and a binder resin having a —$SO_3M$ group and/or —$OSO_3M$ group (where M denotes an alkali metal) introduced thereinto, with the amount of said —$SO_3M$ group and/or —$OSO_3M$ group being 0.2 to 0.8 $\mu$mol per $m^2$ of the surface area of said ferromagnetic powder, said magnetic layer containing a compound having a plurality of carboxyl groups in the molecule, with the amount of said carboxyl groups being 0.5 to 5 $\mu$mol per $m^2$ of the surface area of said ferromagnetic powder, and said magnetic layer also containing carbon having an average particle diameter of 200 to 400 nm and a specific surface area of 5 to 20 $m^2/g$, with the amount of said carbon being 0.5 to 4 parts by weight for 100 parts by weight of said ferromagnetic powder.

DESCRIPTION OF THE PREFERRED EMBODIMENTS

To achieve the above-mentioned object, the present inventors carried out a series of researches, which led to the finding that a ferromagnetic powder is dispersed extremely uniformly if the binder has a —$SO_3M$ group or —$OSO_3M$ group introduced thereinto and the binder is used in combination with a compound having a plurality of carboxyl groups in the molecule. The first aspect of the present invention was completed on the basis of this finding.

The gist of the first aspect of the present invention resides in a magnetic recording medium which comprises a non-magnetic substrate and a magnetic layer formed thereon, said magnetic layer being composed mainly of a ferromagnetic powder having a specific surface area larger than 45 $m^2/g$ and a binder resin having a —$SO_3M$ group and/or —$OSO_3M$ group (where M denotes an alkali metal) introduced thereinto, with the amount of said —$SO_3M$ group and/or —$OSO_3M$ group being 0.2 to 0.8 $\mu$mol per $m^2$ of the surface area of the ferromagnetic powder, and said magnetic layer containing a compound having a plurality of carboxyl groups in the molecule, with the amount of said carboxyl groups being 0.5 to 5 $\mu$mol per $m^2$ of the surface area of the ferromagnetic powder.

The magnetic recording medium of the present invention employs a ferromagnetic powder having a specific surface area larger than 45 $m^2/g$ measured by the BET adsorption method. There are no restrictions as to the kind of the ferromagnetic powder. Examples of the ferromagnetic powder include iron oxide-based one, chromium oxide-based one, metal-based one, and hexagonal ferrite-based one, which are commonly used for magnetic recording media.

According to the present invention, the binder should contain, in at least portion of it, either a metal sulfonate group (—$SO_3M$, where M is an alkali metal such as Na and K) or a metal sulfate group (—$OSO_3M$, where M is an alkali metal such as Na and K). There are no restrictions as to the kind of the binder. Any resinous materials will do which are commonly used in the field of magnetic recording media. Typical examples of the binder resin include the following. Vinyl chloride-vinyl acetate copolymer, vinyl chloride-vinyl acetate-vinyl alcohol copolymer, vinyl chloride-vinyl acetate-maleic acid copolymer, vinyl chloride-vinylidene chloride copolymer, vinyl chloride-acrylonitrile copolymer, acrylic esteracrylonitrile copolymer, acrylic ester-vinylidene chloride copolymer, methacrylic ester-vinylidene chloride copolymer, methacrylic ester-styrene copolymer, thermoplastic polyurethane resin, polyvinyl fluoride, vinylidene chloride-acrylonitrile copolymer, butadiene-acrylonitrile copolymer, acrylonitrile-butadiene-methacrylic acid copolymer, polyvinyl butyral, polyvinyl acetal, cellulose derivative, styrene-butadiene copolymer, polyester resin, phenolic resin, phenoxy resin, epoxy resin, thermosetting polyurethane resin, urea resin, melamine resin, alkyd resin, and urea-formaldehyde resin.

It is possible to cause the binder to contain the metal sulfonate group or metal sulfate group by any one of the following methods.

(a) By preparing the binder only from a resinous material into which either a metal sulfonate group or a metal sulfate group has been introduced.

(b) By preparing the binder from a combination of a resinous material into which either a metal sulfonate group or a metal sulfate group has been introduced and an unmodified resinous material.

(c) By preparing the binder from a combination of a resinous material into which either a metal sulfonate group or a metal sulfate group has been introduced and another resinous material into which other polar groups than mentioned above have been introduced.

What is important regardless of which method is used is that the amount of the metal sulfonate group or metal sulfate group should be 0.2 to 0.8 $\mu$mol per $m^2$ of the surface area of the ferromagnetic powder. With an amount less or more than specified above, the polar group will deteriorate the electromagnetic conversion characteristics.

There are no restrictions as to the method of introducing the metal sulfonate group or metal sulfate group into the resinous material. The introduction of the polar groups will be possible by previously mixing the starting monomer with a compound containing such polar groups, or by modifying the finished polymer.

According to the present invention, the magnetic layer contains, in addition to the ferromagnetic powder and binder, a compound which has a plurality of carboxyl groups in the molecule. This compound improves the dispersibility of the ferromagnetic powder into the binder. This compound is classified according to the number of carboxyl groups contained therein. The compound that can be used for this purpose is one which has two carboxyl groups (or a dicarboxylic acid), one which has three carboxyl groups (or a tricarboxylic acid), and one which has four carboxyl groups (or a tetracarboxylic acid). The dicarboxylic acid includes saturated aliphatic dicarboxylic acids (such as oxalic acid, malonic acid, succinic acid, glutaric acid, adipic acid, pimelic acid, suberic acid, azelaic acid, and sebacic acid), unsaturated aliphatic dicarboxylic acids (such as maleic acid and fumaric acid), and aromatic dicarboxylic acids (such as phthalic acid, isophthalic acid, and terephthalic acid). The tricarboxylic acid includes citric acid, nitrilotriacetic acid, and benzenetricarboxylic acid. The tetracarboxylic acid includes benzenetetracarboxylic acid.

This compound should preferably have a weight-average molecular weight lower than 1000; otherwise it has to be added in a larger amount than specified, which has an adverse effect on the properties of the magnetic layer. This compound should be added in an amount of 0.5 to 5 $\mu$mol per $m^2$ of the surface area of the ferromagnetic powder. With an amount outside this range, the resulting magnetic layer is poor in electromagnetic conversion characteristics.

The magnetic layer may be incorporated with an optional lubricant, anti-static agent, and abrasive material, according to need. A desirable example of the lubricant is a higher fatty acid (saturated or unsaturated) having 12 or more carbon atoms.

The above-mentioned components are mixed with an organic solvent to be made into a magnetic paint. The organic solvent is selected from among ketones, esters, ethers, aromatic hydrocarbons, aliphatic hydrocarbons, and chlorinated hydrocarbons, according to the kind of the ferromagnetic powder and binder. The resulting magnetic paint is applied to a non-magnetic substrate so as to form the magnetic layer. There are no restrictions on the kind of the non-magnetic substrate and the method of applying the magnetic paint. Any known substrate and any known method can be used.

The combined use of the binder having —$SO_3M$ or —$OSO_3M$ groups and the compound having carboxyl groups produces a synergistic effect of greatly improving the dispersibility of the ferromagnetic powder having a specific surface area larger than 45 $m^2/g$. This leads to an improvement in the surface properties and electromagnetic conversion characteristics of the magnetic layer.

The improvement in dispersibility depends on the amount of —$SO_3M$ or —$OSO_3M$ groups introduced into the binder and also on the amount of the carboxyl group-containing compound added in proportion to the surface area of the ferromagnetic powder. The best result is achieved when 7 the former is 0.2 to 0.8 μmol and the latter is 0.5 to 5 μmol per m² of the surface area of the ferromagnetic powder.

According to the first aspect of the present invention mentioned above, it is possible to improve the dispersibility of ferromagnetic powder. In addition to the first aspect, it was also found that it is possible to improve the runnability of the magnetic recording medium without altering the electromagnetic conversion characteristics in short-wave recording, if the magnetic layer is incorporated with a small amount of carbon having a comparatively large diameter. The second aspect of the present invention was completed on the basis of this finding. Thus the gist of the second aspect of the present invention resides in a magnetic recording medium which comprises a non-magnetic substrate and a magnetic layer formed thereon, said magnetic layer being composed mainly of a ferromagnetic powder having a specific surface area larger than 45 m²/g and a binder resin having a —SO₃M group and/or —OSO₃M group (where M denotes an alkali metal) introduced thereinto, with the amount of said —SO₃M group and/or —OSO₃M group being 0.2 to 0.8 μmol per m² of the surface area of said ferromagnetic powder, said magnetic layer containing a compound having a plurality of carboxyl groups in the molecule, with the amount of said carboxyl groups being 0.5 to 5 μmol per m² of the surface area of said ferromagnetic powder, and said magnetic layer also containing carbon having an average particle diameter of 200 to 400 nm and a specific surface area of 5 to 20 m²/g, with the amount of said carbon being 0.5 to 4 parts by weight for 100 parts by weight of said ferromagnetic powder.

According to the present invention, the amount of —SO₃M group or —OSO₃M groups and the amount of the carboxyl group-containing compound are determined depending on the surface of the ferromagnetic powder. The former should be 0.2 to 0.8 μmol and the latter should be 0.5 to 5 μmol per m² of the surface area of the ferromagnetic powder.

The addition of a small amount of carbon having a comparatively large particle diameter (200–400 nm) offsets the disadvantage in runnability which arises from an excessively smooth surface due to the extremely uniform dispersion of ferromagnetic powder. Moreover, the addition of carbon has no adverse effect on the electromagnetic conversion characteristics.

EXAMPLES

The invention will be more clearly understood with reference to the following examples.

Examples 1 to 3 and Comparative Examples 1 and 2

A magnetic paint was prepared from a composition of the following basic formulation which was incorporated with a compound having a plurality of carboxyl groups in the molecule using a sand mill and subsequently with 4 parts by weight of curing agent ("Coronate L" trade name of triisocyanate compound) by continued mixing. The resulting magnetic paint was applied onto a 10-μm thick base film so as to form a coating having a dry thickness of 3 μm. The coating film underwent magnetic orientation, drying, super calendering, and curing. Thus there was obtained a magnetic layer. The coated film was provided with a 0.8-μm thick back coating, followed by slitting into 8-mm wide sample tape. Basic formulation (A)

| | |
|---|---|
| Metal magnetic powder (Specific surface area: 51 m²/g) | 100 parts by weight |
| Polyvinyl chloride binder | 15 parts by weight |
| Polyurethane binder | 6 parts by weight |
| Chromium oxide | 8 parts by weight |
| Carbon | 3 parts by weight |
| Stearic acid | 1 part by weight |
| Butyl stearate | 2 parts by weight |
| Methyl ethyl ketone | 125 parts by weight |
| Toluene | 75 parts by weight |
| Cyclohexanone | 50 parts by weight |

Examples 4 to 7 and Comparative Examples 3 to 5

The same procedure as in the above-mentioned Examples was repeated to prepare sample tape, except that the basic formulation was replaced by the following one.

| Basic formulation (B) | |
|---|---|
| Metal magnetic powder (Specific surface area: 60 m²/g) | 100 parts by weight |
| Polyvinyl chloride binder | 10 parts by weight |
| Polyurethane binder | 10 parts by weight |
| Alumina | 6 parts by weight |
| Carbon | 5 parts by weight |
| Stearic acid | 1 part by weight |
| Butoxyethyl stearate | 1 part by weight |
| Methyl ethyl ketone | 125 parts by weight |
| Toluene | 70 parts by weight |
| Cyclohexanone | 50 parts by weight |

Table 1 below shows the kind of the binder, the content of polar groups in the binder, and the kind and amount of the carboxyl group-containing compound (referred to as polycarboxylic acid hereinafter) used in the Examples and Comparative Examples. The content of polar groups in the binder and the amount of the polycarboxylic acid are based on 1 m² of the surface area of the ferromagnetic powder (metal magnetic powder).

The designations for the binders and polycarboxylic acids in Table 1 have the following meaning.

Polyvinyl chloride binder
A: Vinyl chloride-acrylate copolymer
  Average degree of polymerization: 340
  Amount of —SO₃K: 0.04 mmol/g
B: Vinyl chloride-acrylate copolymer
  Average degree of polymerization: 305
  Amount of —SO₃K: 0.08 mmol/g
C: Vinyl chloride-acrylate copolymer
  Average degree of polymerization: 390
  Amount of —SO₃Na: 0.12 mmol/g
D: Vinyl chloride-acrylate copolymer
  Average degree of polymerization: 410
  Amount of —SO₃Na: 0.24 mmol/g
Polyurethane binder
A: made by reaction of isophthalic acid, terephthalic acid, ethylene glycol, neopentyl glycol, and diphenylmethane diisocyanate
  Number-average molecular weight: 24000
  Amount of —SO₃Na: 0.05 mmol/g
B: made by reaction of isophthalic acid, terephthalic acid, ethylene glycol, neopentyl glycol, and diphenylmethane diisocyanate
  Number-average molecular weight: 21000
  Amount of —SO₃Na: 0.10 mmol/g
C: made by reaction of isophthalic acid, terephthalic acid, ethylene glycol, neopentyl glycol, and diphen- -continued ylmethane diisocyanate
Number-average molecular weight: 18000
Amount of —SO₃Na: 0.18 mmol/g
D: made by reaction of isophthalic acid, terephthalic acid, ethylene glycol, neopentyl glycol, and diphenylmethane diisocyanate
Number-average molecular weight: 16000
Amount of —SO₃Na: 0.30 mmol/g
E: made by reaction of isophthalic acid, 1,6-hexane glycol, and diphenylmethane diisocyanate
Number-average molecular weight: 24000
Amount of —SO₃Na: 0.10 mmol/g Polycarboxylic acid C: Citric acid
N: Nitrilotriacetic acid Table 1 also shows the electromagnetic conversion characteristics of the sample tapes, which were measured using Sony's 8-mm VTR and expressed in terms of output (at 5 MHz) and C/N (5 MHz signals as carrier and 4 MHz signals as noise). The values are relative to that in Example 1.

Incidentally, the carbon used in the above-mentioned examples is "Carbon C" explained later.

thereinto and also contains a prescribed amount of a compound containing a plurality of carboxyl groups in the molecule. Thus the present invention provides a magnetic recording medium having superior surface properties and electromagnetic conversion characteristics.

The compound having a plurality of carboxyl groups in the molecule has a strong affinity for the binder and hence contributes to the strength of the coating film.

Examples 8 to 14 and Comparative Examples 6 to 14

Sample tapes were prepared in the same manner as mentioned above from the basic formulation as shown in Table 2. The polycarboxylic acid designated as M is maleic acid, and the polyurethane binder designated as F is made by reaction of isophthalic acid, terephthalic acid, ethylene glycol, neopentyl glycol, and diphenylmethane diisocyanate, which has a number-average molecular weight of 26000 and contains 0.02 mmol/g of —SO₃Na group. The performance of the sample tapes is also shown in Table 2. Note that the basic formulation additionally contains carbon whose designation and properties are shown below.

TABLE 1

| Example No. (Comparative Example No.) | Basic formulation | Vinyl chloride binder | Polyurethane binder | Amount of polar group in binder (μmol) | Kind of polycarboxylic acid | Amount of polycarboxylic acid (μmol) | Output (5 MHz) (dB) | C/N (5/4 MHz) (dB) |
|---|---|---|---|---|---|---|---|---|
| 1 | A | B | E | 0.35 | C | 1.0 | 0 | 0 |
| 2 | A | B | E | 0.35 | C | 2.0 | +0.8 | +1.0 |
| 3 | A | B | E | 0.35 | C | 4.1 | +0.9 | +1.1 |
| (1) | A | B | E | 0.35 | C | 6.1 | −0.3 | −0.5 |
| (2) | A | B | E | 0.35 | — | — | −1.1 | −1.4 |
| 4 | B | C | A | 0.28 | N | 1.3 | +0.2 | +0.1 |
| 5 | B | C | A | 0.28 | N | 2.7 | +0.4 | +0.4 |
| 6 | B | A | C | 0.37 | N | 2.7 | +0.8 | +0.7 |
| 7 | B | D | B | 0.57 | N | 2.7 | +0.7 | +0.5 |
| (3) | B | C | A | 0.28 | — | — | −0.6 | −0.5 |
| (4) | B | A | B | 0.15 | N | 2.7 | −0.6 | −0.3 |
| (5) | B | D | D | 0.90 | N | 2.7 | −0.4 | −0.4 |

It is noted from Table 1 that the sample tapes obtained in Examples exhibit good electromagnetic conversion characteristics. By contrast, the sample tapes obtained in Comparative Examples are poor in electromagnetic conversion characteristics, because the polycarboxylic acid is not added in Comparative Examples 2 and 3, the polycarboxylic acid is added in an excess amount in Comparative Example 1, the amount of metal sulfonate group or sulfate group is too small in Comparative Example 4, and the amount of metal sulfonate group or sulfate group is excessive in Comparative Example 5.

It will be understood from the foregoing that according to the present invention, extremely fine ferromagnetic powder can be uniformly dispersed in the binder because the binder resin contains a prescribed amount of —SO₃M group or —OSO₃M group introduced A: Average particle diameter - 350 nm
Specific surface area - 7 m²/g
DBP oil absorption - 38 mL/100 g
B: Average particle diameter - 270 nm
Specific surface area - 9 m²/g
DBP oil absorption - 36 mL/100 g
C: Average particle diameter - 80 nm
Specific surface area - 20 m²/g
DBP oil absorption - 48 mL/100 g Table 2 also shows the electromagnetic conversion characteristics and the coefficient of friction of the sample tapes. The former evaluated by measuring the output at 5 MHz and the C/N (7 MHz signals as carrier and 6 MHz signals as noise). The values are relative to that in Example 8. The coefficient of friction was measured at 40° C. and 80% RH.

TABLE 2

| Example No. (Comparative Example No.) | Vinyl chloride binder | Polyurethane binder | Amount of polar group in binder (μmol) | Kind of polycarboxylic acid | Amount of polycarboxylic acid (μmol) | Kind of carbon | Amount of carbon (parts by weight) | Output (5 MHz) (dB) | C/N (7/6 MHz) (dB) | Coefficient of friction |
|---|---|---|---|---|---|---|---|---|---|---|
| 8 | B | A | 0.22 | M | 2.8 | A | 2 | 0 | 0 | 0.21 |
| 9 | B | C | 0.43 | M | 2.8 | A | 2 | +0.5 | +0.3 | 0.23 |
| 10 | B | C | 0.43 | M | 2.8 | A | 2 | +0.4 | +0.6 | 0.24 |
| 11 | B | C | 0.43 | M | 2.8 | A | 2 | +0.4 | +0.2 | 0.27 |
| (6) | B | F | 0.17 | M | 2.8 | A | 2 | −0.6 | −0.9 | 0.19 |
| (7) | D | D | 0.90 | M | 2.8 | A | 2 | −0.4 | −0.7 | 0.25 |
| (8) | B | C | 0.43 | — | — | A | 2 | −0.9 | −1.3 | 0.17 |
| (9) | B | C | 0.43 | M | 2.8 | — | — | +4.8 | +0.9 | 0.62 |

TABLE 2-continued

| Example No. (Comparative Example No.) | Vinyl chloride binder | Poly- urethane binder | Amount of polar group in binder (μmol) | Kind of polycarbox- ylic acid | Amount of polycarboxylic acid (μmol) | Kind of carbon | Amount of carbon (parts by weight) | Output (5 MHz) (dB) | C/N (7/6 MHz) (dB) | Coeffi- cient of friction |
|---|---|---|---|---|---|---|---|---|---|---|
| 12 | C | C | 0.50 | N | 2.2 | B | 1 | +0.6 | +0.6 | 0.28 |
| 13 | C | C | 0.50 | N | 2.2 | B | 2 | +0.4 | +0.2 | 0.26 |
| 14 | C | C | 0.50 | N | 2.2 | B | 3 | +0.2 | +0.1 | 0.22 |
| (10) | C | C | 0.50 | N | 2.2 | — | — | +0.8 | +1.1 | 0.69 |
| (11) | C | C | 0.50 | N | 2.2 | C | 1 | +0.4 | +0.1 | 0.57 |
| (12) | C | C | 0.50 | N | 2.2 | C | 3 | +0.1 | −0.2 | 0.43 |
| (13) | C | C | 0.50 | N | 2.2 | C | 5 | −1.6 | −1.8 | 0.31 |
| (14) | C | C | 0.50 | N | 2.2 | B | 5 | −1.0 | −1.4 | 0.17 |

It is noted from Table 2 that the sample tapes obtained in Examples exhibit good electromagnetic conversion characteristics. By contrast, the sample tapes obtained in Comparative Examples are poor in electromagnetic conversion characteristics, because the polycarboxylic acid is not added in Comparative Example 8, the amount of metal sulfonate group or sulfate group is too small in Comparative Example 6, and the amount of metal sulfonate group or sulfate group is excessive in Comparative Example 7.

It is also noted from Table 2 that the sample tapes obtained in Examples have a low coefficient of friction and hence exhibit good runnability. By contrast, the sample tapes obtained in Comparative Examples 9 and 10 in which no carbon was added have an extremely high coefficient of friction. The sample tape obtained in Comparative Example 14 in which an excess amount of carbon was added is poor in electromagnetic conversion characteristics. The results obtained in Comparative Examples 11 and 13 in which carbon of smaller particle diameter was added indicate that the smaller the amount added, the better the electromagnetic conversion characteristics but the higher the coefficient of friction, and that the larger the amount added, the lower the coefficient of friction but the poorer the electromagnetic conversion characteristics. In other words, the electromagnetic conversion characteristics and the coefficient of friction are incompatible with each other.

It will be understood from the foregoing that according to the present invention, an extremely fine ferromagnetic powder can be uniformly dispersed in the binder because the binder resin contains a prescribed amount of —SO$_3$M group or —OSO$_3$M group introduced thereinto and also contains a prescribed amount of a compound containing a plurality of carboxyl groups in the molecule. Thus the present invention provides a magnetic recording medium having superior surface properties and electromagnetic conversion characteristics in the short wave region.

The compound having a plurality of carboxyl groups in the molecule has a strong affinity for the binder and hence contributes to the strength of the coating film.

Moreover, the magnetic recording medium of the present invention has a low coefficient of friction and hence has superior runnability because it contains a small amount of carbon having a specific particle diameter.

We claim as our invention:

1. A magnetic recording medium which comprises a non-magnetic substrate and a magnetic layer formed thereon, said magnetic layer being composed mainly of a ferromagnetic powder having a specific surface area larger than 45 m$^2$/g and a binder resin having a —SO$_3$M group or —OSO$_3$M group or both (where M denotes an alkali metal introduced thereinto, with the amount of said —SO$_3$M group or —OSO$_3$M group or both being 0.2 to 0.8 μmol per m$^2$ of the surface area of the ferromagnetic powder, and said magnetic layer containing a compound having a plurality of carboxyl groups in the molecule, with the amount of said carboxyl groups being 0.5 to 5 μmol per m$^2$ of the surface area of said ferromagnetic powder, and said magnetic layer also containing carbon having an average particle diameter of 200 to 400 nm and a specific surface area of 5 to 20 m$^2$/g, with the amount of said carbon being 0.5 to 4 parts by weight for 100 parts by weight of said ferromagnetic powder.

* * * * *